3,498,795
SUPERSEEDING OF KHT IN WINE
Edward G. Walter, 1016 El Terino,
Modesto, Calif. 95350
Filed June 29, 1967, Ser. No. 650,033
Int. Cl. C12h *1/10;* C12g *1/00*
U.S. Cl. 99—48                                                    10 Claims

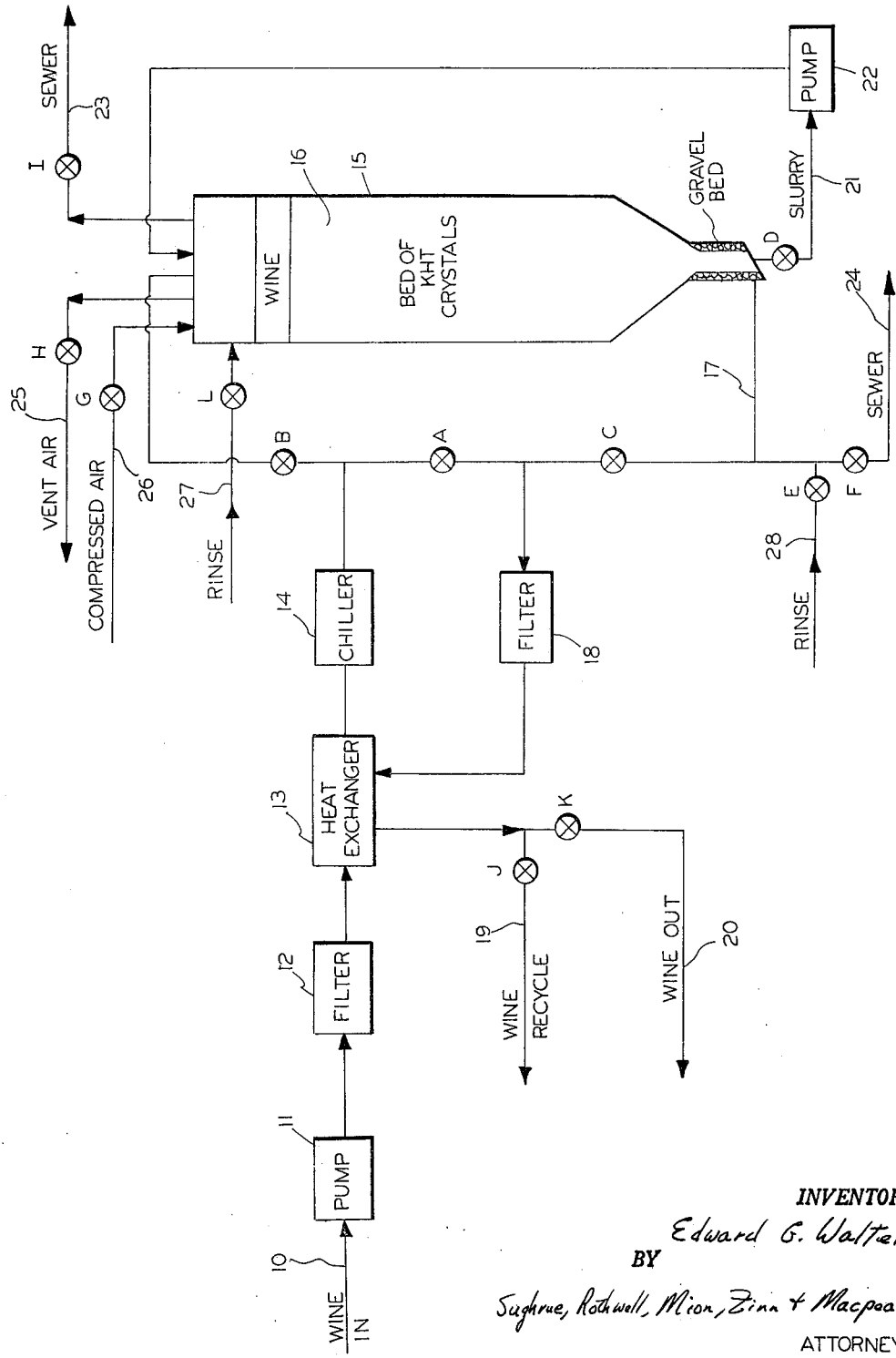

ABSTRACT OF THE DISCLOSURE

Wine is stabilized by passing cooled wine through a column containing potassium hydrogen tartrate crystals whereby the potassium hydrogen tartrate dissolved in the wine is deposited on the crystals in the column.

BACKGROUND OF THE INVENTION

One of the great problems facing the wine industry is the tendency toward the formation of deposits in wine upon standing after having been bottled. These deposits are principally potassium hydrogen tartrate (KHT), KHT is normally present in new wines and acts as a buffer for tartaric acid which enhances the wine flavor. Because the solubility of KHT decreases as the wine temperature is lowered, it will deposit out as an insoluble precipitate upon cooling the wine after it has been bottled. Thus, all new wines are said to be "cold unstable."

The KHT deposits are harmless, however, their presence renders the wine unattractive and unsaleable. Consequently, much research in the wine industry has been directed toward an efficient method for either preventing KHT precipitation or its partial removal from new wines.

The classical method comprises chilling the new wines to temperatures near their congelation points (15–22° F.) and allowing them to stand quietly for several weeks. The KHT will then slowly crystallize out into a filterable state. This process suffers from several disadvantages. First, the method is very time consuming and, therefore, inefficient. Secondly, the equipment required for this operation is bulky and expensive, thereby rendering it commercially unattractive. Thirdly, materials other than KHT which are necessary to maintain the flavor and coloring of the wine are also deposited out by this method.

It has also been proposed to add calcium carbonate to new wines and filter off the calcium tartrate which precipitates. This method, however, is applicable only to wines of high acidity inasmuch as the acidity of the wine is also reduced by this method.

It has also been proposed to treat new wines with ion-exchange resins. By contacting the wine with a cation-exchange resin, sodium may be exchanged for the potassium in KHT leaving sodium hydrogen tartrate in the wine which will not precipitate out. Also, it has been proposed to employ an anion-exchange resin to remove the tartrate anion. Although more efficient than the methods described above, the ion exchange treatment methods are not totally satisfactory. First, the cation-exchange resin treatment results in the addition of undesirable sodium ions into the wines resulting in an altered taste. Also, both the anion-exchange and cation-exchange resin treatments are not selective, i.e., they result in the removal of cations and anions other than potassium and tartrate which are necessary to maintain the delicate flavor and color balance of the wines. Finally, it has been proposed to seed new wines with KHT crystals to hasten the KHT deposition in the classical method described above, however, these attempts have consistently met with failure.

BRIEF DESCRIPTION OF THE PRESENT INVENTION

It is an object of the present invention to provide a method for the cold stabilization of new wines.

It is a further object of the present invention to provide a method for the partial removal of KHT from new wines, resulting in a cold-stabilized wine, which is not subject to the various disadvantages discussed above.

Briefly, the method according to the present invention comprises flowing a chilled, new wine through a column filled with KHT crystals which grow at the expense of the KHT contained in the wine resulting in a cold stabilized wine containing an amount of KHT below the level necessary for precipitation upon long periods of standing at low temperatures.

The drawing depicts apparatus and a flow sheet suitable for carrying out the method of the present invention.

DETAILED DESCRIPTION OF THE INVENTION

To illustrate the method of the present invention, reference may be had to the accompanying drawing. New wine is pumped through conduit 10 by pump 11 into filter 12 to remove insoluble impurities and then conducted into heat exchanger 13 wherein it is precooled by cold stabilized wine from a subsequent operation. The precooled wine is then conducted into chiller 14 wherein it is cooled to just above its congelation point. The wine is then conducted into column 15 containing a bed of KHT crystals. As the wine passes through the KHT crystals 16, dissolved KHT precipitates onto these crystals resulting in their growth. The thus cold stabilized wine is then conducted through conduit 17 into filter 18 wherein the wine is again filtered to remove any insoluble impurities. The thus clarified and cold stabilized wine is conducted through heat exchanger 13 wherein it cools incoming new wine. The cold stabilized wine may then be recycled through conduit 19 for further treatment, or conducted through conduit 20 to storage or a bottling operation. It is preferred, although not necessary, to maintain the bed of KHT crystals 16 continually moving during the treating process to prevent their coalescing into a large unmanageable cake. A slurry of KHT crystals is withdrawn from column 15 through conduit 21 and pumped by pump 22 back to the top of column 15. During this recycle step, the KHT crystals which have grown in size to the deposition thereon of KHT contained in the wine, are circulated prior to their return to column 15 to prevent coalescing.

Column 15 may also be provided with conduit means 26 for blowing compressed air through the column in order to completely eliminate wine therefrom. Moreover, rinse conduits 27 and 28 may be provided in the system for cleansing purposes. Column 15 should also be provided with a vent conduit 25 and sewer conduits 23 and 24. The various conduit lines are provided with valves A, B, C, D, E, F, G, H, I, J, K and L in order to vary the flow rates therein.

The following is a description of a typical operation utilizing the above described system:

Fill step

Valves B, D, E, F, G, I, J, K and L are closed while valves A, C, and H are opened. New wine is pumped through conduit 10 by pump 11 into column 15 at a slow rate in order to eliminate air pockets from the KHT crystal bed 16. During this filling step, some chilling of the wine takes place. Pump 22 remains off during the filling operation.

Chilling step

Valves A, E, F, G, H, I, K and L are closed while valves B, C, D, and J are opened. Pumps 11 and 22 and chiller 14 are actuated. Chilled wine then flows through column 15 and back through conduit 19 for recycle. This operation is continued until the temperature in column 15 is substantially the same as that of the chilled wine.

Treating step

Valves A, E, F, G, H, I, J and L are closed and valves B, C, D and K are opened. Pumps 11 and 22 are actuated. Cold stabilized wine is collected through conduit 20 for further processing or bottling. KHT crystal bed 16 is kept constantly moving by pump 22 through conduit 21 to avoid caking of the crystal bed.

Regeneration step

The potassium level of the withdrawn, cold stabilized wine is continually monitored during the treatment operation. When the potassium level rises above the stability point, the processing is terminated and the column 15 rinsed to regenerate the KHT crystal bed 16.

Vacating step

Valves A, B, D, E, F, H, I, J and L are closed while valves C, G and K are opened. Pumps 11 and 22 are deactuated and the wine remaining in the system is blown from column 15 by compressed air through conduit 26.

Rinse step (fill)

Valves A, B, C, D, F, G, J, K and L are closed while valves E, H and I are opened. Pumps 11 and 22 remain deactuated and the column 15 is slowly filled from the bottom with water through conduits 28 and 17 at a slow rate to eliminate air pockets from KHT crystal bed 16.

Rinse step (downflow)

Valves A, B, C, E, G, H, I, J and K are closed while valves F, D and L are opened. Pump 11 remains off and pump 22 is actuated. Rinse water is admitted to column 15 through conduit 27. Rinse water containing dissolved KHT is sewered (or saved) through conduit 24. The rinse is continued until column 15 attains its original KHT content.

Vacating step

Valves A, B, C, D, E, H, I, J, K and L are closed while valves F and G are opened. Pumps 11 and 22 are deactuated. Column 15 is then blown down with compressed air through conduit 26 to remove the water rinse.

The system is then ready for another wine treating cycle.

It is to be understood that the only process steps necessary for the practice of the method according to the present invention are (1) chilling the wine to a temperature near its congelation point and (2) contacting the chilled wine with a body of KHT crystals. The various precooling, filtering, rinsing steps, etc., are completely optional and are included in this discussion solely to set forth the preferred embodiment of the invention. Moreover, it is not necessary to flow the chilled wine down through a KHT crystal bed; rather, the wine may be flowed upwardly through a similar bed. Optionally, the chilled wine and a slurry of KHT crystals could be contacted countercurrently to accomplish cold stabilization of the wine. It is further to be understood that it is not necessary to maintain the KHT crystal bed in a constantly moving state. However, it is preferred to do so in order to avoid the formation of an unmanageable, coalesced cake of KHT crystals. This may be accomplished by any equivalent method which insures the continual movement or migration of the KHT crystal bed.

The method according to the present invention avoids the disadvantages associated with the prior art methods. Thus, an inexpensive recovery of KHT by-product is possible. Moreover, the KHT by-product is localized thereby enabling its easier recovery over the classical method which required scraping the KHT crystals from the tank walls. The process is amenable to the treatment of both ordinary and premium wines and is as efficient or more efficient than the prior art ion-exchange resin treating processes and is more inexpensive to operate. Most importantly, the process removes only KHT from the new wines and does not affect its color, taste or other materials necessary for optimum wine production.

EXAMPLE

Employing a system similar to that shown in the accompanying drawing, two different wines were stabilized according to the following procedure.

A glass column four inches in diameter and three feet in height and containing a mixed bed of 40 to 100 mesh KHT crystals was employed. A gravel bed was placed in the bottom of the column to prevent the KHT crystals from flowing out.

The two wines treated had the following composition. One was a mixed-dry-white wine with a tatrate content of 2800 milligrams/liter and a potassium content of 800 milligrams/liter. The other wine was a Zinfandel red wine having a tartrate content of 3400 milligrams/liter and a potassium content of 1115 milligrams/liter.

Each of the wines was cooled to 25° F. and run through the KHT containing column at a flow rate of 4 bed volumes per hour. Thirty bed volumes of the mixed white wine and 20 bed volumes of the red wine were run through the column before it became necessary to rinse the column and regenerate the KHT crystals.

Analysis of the wines showed that only the potassium and tartrate content and total acidity were affected by the process. The stabilized mixed white wine had a tartrate content of 1900 milligrams/liter and a potassium content of 524 milligrams/liter and a total acidity drop of 0.04 gram/100 cc. The red wine had a tartrate content of 2300 milligrams/liter and a potassium content of 800 milligrams/liter and a total acidity drop of 0.05 gram/100 cc. Further analysis showed that the alcohol, sugar, pH, Ca, Na, etc. content were not affected by the process.

Thus, it is apparent that the process according to the present invention results in an efficient and marked reduction in the KHT content of wines treated. Moreover, it is apparent that the process is selective in that other materials contained in the wines which contribute to their taste, color, etc. are not affected by the process.

The process is applicable for the treatment of any KHT containing wines whether they be white wines, red wines, high acidity wines, fortified wines, etc. Obviously, the KHT concentration of any particular wine will vary with grape-type, locale, season, etc.

The temperature to which the wine is cooled is not overly critical. It is only necessary to cool the wine to a temperature near its congelation point. Obviously, the congelation point of a particular wine will vary with its alcohol content, etc. Normally, the congelation point of most wines varies between 15 and 22° F. It is preferred to maintain the treating column, conduits, etc. highly insulated to maintain the cooling efficiency in the precooling step.

The flow rate and volume of wine contacted with the KHT crystal body is not overly critical. Obviously, however, these parameters will depend to a large extent on the capacity of the treating column and the number of recycles contemplated. Of course, recycling should be kept to a minimum.

The optimum flow rate is quickly determined by varying the rate while monitoring the potassium (K) content of the emerging wine. The flow rate is then increased until the K content starts to rise. A slightly lessened flow rate is then the optimum rate. Obviously, there is no minimum flow rate.

The crystal size of the KHT is not critical. Obviously, if two large crystals are employed, the efficiency of the treatment will be reduced due to the smaller area/mass ratio. Generally, crystal sizes of from about 40 to about 100 mesh will produce optimum results. However, it is to be understood that KHT crystals of any size may be employed in the process according to the invention.

As discussed above, the precooling step whereby incoming new wine is placed in heat exchange relationship with stabilized, cooled wine from a subsequent treating step in order to achieve thermal efficiency, is not necessary to the practice of the invention. If it is desired to store the stabilized wine in a cooled state or treat it in accordance with another process, the treated wine will not be employed to precool the incoming wine. However, by using the treated wine to precool the incoming wine, the load on the plant's cooling capacity is lowered and the overall efficiency of the treating process enhanced.

The size of the column or container containing the KHT crystal bed is not critical. Obviously, if it is desired to treat large volumes of wine at high flow rates for long periods of time without the necessity of regenerating the KHT crystal bed, large columns or containers must be employed. Moreover, the apparatus may be constructed of any available material commonly employed in wine treating apparatus, such as steel, glass, etc. Moreover, the apparatus may take any desired shape. It has been found, however, that optimum results are obtained employing a column wherein the length is at least three times the diameter.

What is claimed is:
1. A method for stabilizing wine comprising reducing potassium hydrogen tartrate content thereof by passing cooled wine through a column containing potassium hydrogen tartrate crystals whereby the potassium hydrogen tartrate dissolved in said wine is deposited on said potassium hydrogen tartrate crystals.

2. A method according to claim 1 including the step of cooling said wine prior to contact with said potassium hydrogen tartrate crystals.

3. A method according to claim 2 including the step of filtering said wine prior to cooling.

4. A method according to claim 2 wherein said cooling is accomplished by first subjecting said wine to a heat exchange relationship with cool, stabilized wine from said contacting step and then further cooling said wine.

5. A method according to claim 2 wherein said wine is cooled to a temperature near the congelation point of said wine.

6. A method according to claim 1 wherein said body of potassium hydrogen tartrate crystals is maintained in a substantially continually moving state.

7. A method according to claim 6 wherein said body of potassium hydrogen tartrate crystals are maintained in said moving state by continually removing potassium hydrogen tartrate crystals from the contacting zone at one locus and re-adding said crystals to said zone at another locus.

8. A method according to claim 1 wherein the size of said potassium hydrogen tartrate crystals varies from about 40 to about 100 mesh.

9. A method according to claim 1 wherein said wine is contacted with said body of potassium hydrogen tartrate crystals at a rate of between about 3 and 10 bed volumes per hour.

10. A method according to claim 2 wherein said stabilized wine is recycled to said cooling step for further treatment.

References Cited
UNITED STATES PATENTS
2,847,308   8/1958   Bersworth et al. _____ 99—35 X

OTHER REFERENCES
Wines and Wines, vol. 36, No. 1, January 1935 (page 28).

LIONEL M. SHAPIRO, Primary Examiner

D. M. NAFF, Assistant Examiner

U.S. Cl. X.R.

99—35